3 Sheets--Sheet 1.

T. L. RITTENHOUSE & J. V. LEWIS.
Corn-Planter.

No. 169,041. Patented Oct. 19, 1875.

WITNESSES:

INVENTORS.
Thos. L. Rittenhouse
J. Vance Lewis
PER Daniel Breed
ATTORNEY.

3 Sheets--Sheet 2.
T. L. RITTENHOUSE & J. V. LEWIS.
Corn-Planter.
No. 169,041. Patented Oct. 19, 1875.
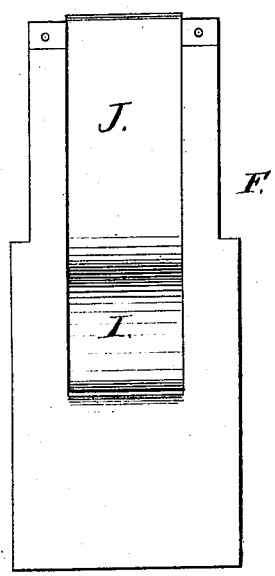
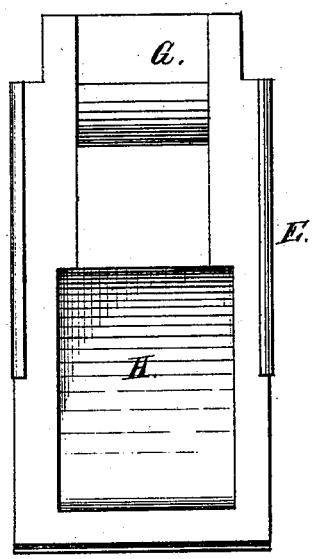
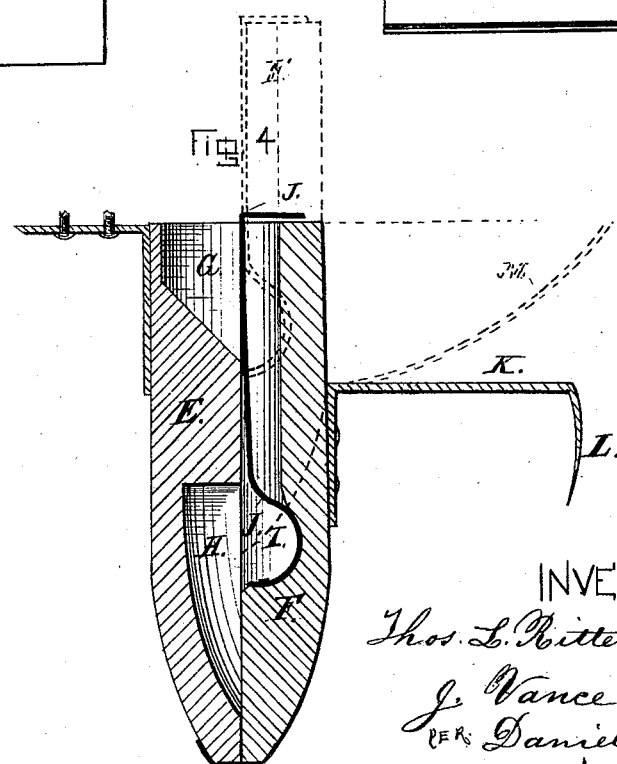
WITNESSES:
INVENTORS:
Thos. L. Rittenhouse
J. Vance Lewis
PER: Daniel Breed
ATTORNEY.

3 Sheets--Sheet 3.

T. L. RITTENHOUSE & J. V. LEWIS.
Corn-Planter.

No. 169,041.                    Patented Oct. 19, 1875.

WITNESSES:

INVENTORS:
Thos. L. Rittenhouse
J. Vance Lewis
PER Daniel Breed
ATTORNEY.

UNITED STATES PATENT OFFICE.

THOMAS L. RITTENHOUSE AND J. VANCE LEWIS, OF WASHINGTON, D. C.

IMPROVEMENT IN CORN-PLANTERS.

Specification forming part of Letters Patent No. 169,041, dated October 19, 1875; application filed September 9, 1875.

*To all whom it may concern:*

Be it known that we, THOMAS L. RITTENHOUSE and J. VANCE LEWIS, of Washington, in the county of Washington and District of Columbia, have invented certain new and useful Improvements in Corn-Planters; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention consists of a planting-wheel, with a hollow felly, which serves as a corn-box; and also in a novel construction of measuring-bills and other devices, all of which will be fully described in the following specification.

Figure 1:
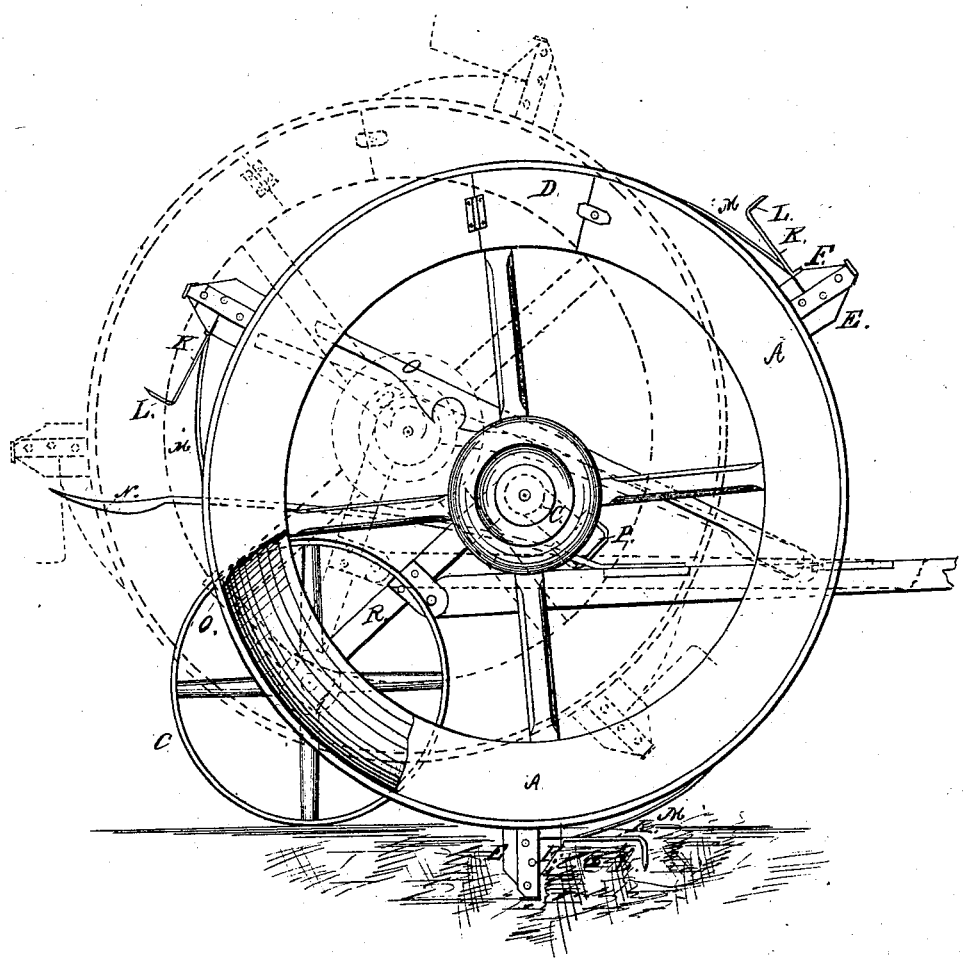
Figure 5:
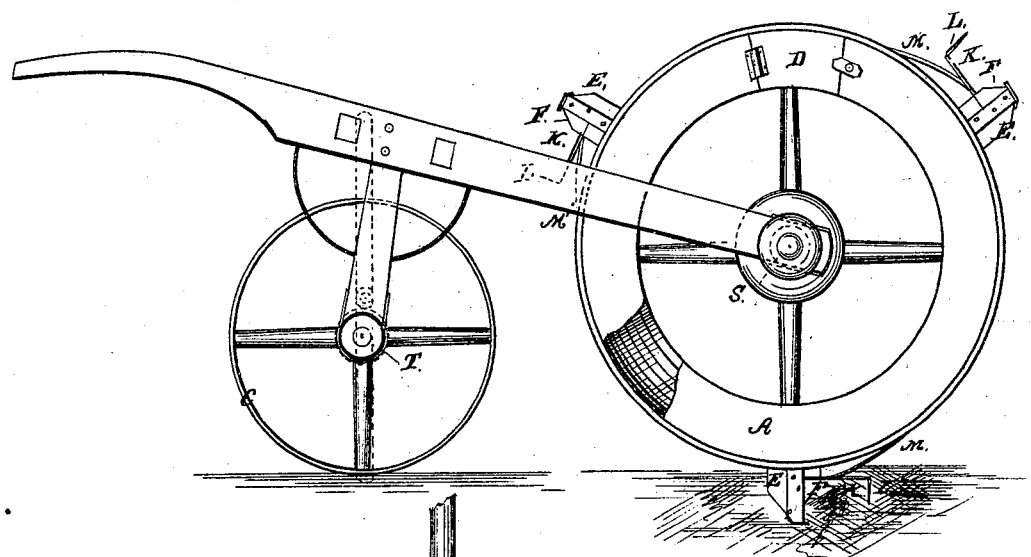
Figure 6:
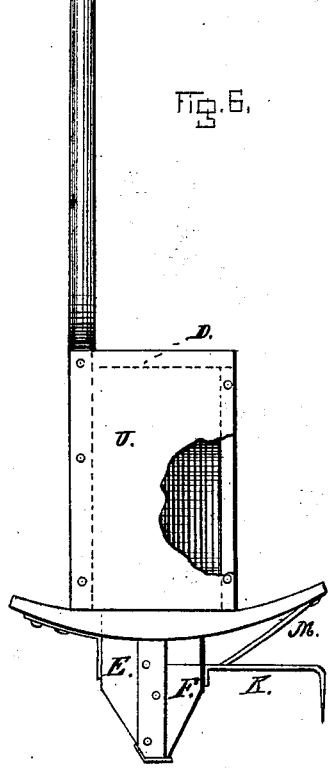

In the accompanying drawings, Figure 1 is a side view of our machine. Figs. 2, 3, and 4, Sheet 2, are detached views of the measuring-bills. Figs. 5 and 6, Sheet 3, are modifications of our machine.

We propose, generally, to use a two-wheeled machine, with one or two horses, as seen in Fig. 1, but our improvements are also applicable to hand-machines.

The traveling-wheels A are of peculiar and novel construction. The fellies of the wheels are hollow and yet very light. They may be cast in two or more sections, and at present we prefer to make three sections—say, about three inches on the tread of the felly, and about two and a half inches deep. These sections of chambered felly may be cast with sockets to receive the spokes of the wheel, or they may be attached to the side of the fellies of an ordinary wheel; but we prefer to make the hub and spokes of wood, and use a hollow felly, substantially in the form shown in the drawings.

While planting with our machine the wheels A travel upon the ground, and the bills E F enter the ground and drop the corn. These bills are set as far apart as we desire to plant the hills. The axle C turns with the wheels A, so that both wheels drop the corn at the same time, and thus plant in cross-rows by simply taking care to start right at the beginning of the rows. The pair of small wheels C serve to elevate the planting-wheels A, as seen in dotted lines in Fig. 1, and thus stop the planting while the machine is turning at the ends of the rows or traveling to or from the field. The corn to be planted is put into the hollow fellies of the wheels A, a small door, D, being opened for that purpose. The wheels being thus charged with corn the machine is started. As the wheels A travel over the ground the bills E and F come down one after the other to plant a hill of corn, the details of which will soon be explained.

The construction of these bills will be better understood by reference to Figs. 2, 3, and 4, Sheet 2. The bill E is stationary or fixed on the felly of wheel A; and the bill F slides up and down upon the stationary bill. The bill E has two cups or chambers, the one, G, being intended to receive the corn from the hollow felly, and fill the traveling cup I of the sliding bill, and the other cup H delivers or discharges the corn into the ground. When the sliding bill F is pushed up the carrying-cup I is filled with corn, and when this bill slides down it brings down a charge of corn—usually four or five kernels. This cup has a spring, J, fastened to the bottom of the cup I, and this spring gently cuts off the flow of corn, and also prevents cutting or jamming the kernels as the slide is pushed down. The action of this spring is very important in measuring the corn, and also in preventing the slide F from being stopped or choked by the corn. As the wheel A is moving forward in planting, after the bills E and F have both entered the ground to the proper depth for planting the hill of corn, the resistance of the earth striking the pedal K pushes up the sliding bill F, thus opening the discharge-cup H, and dropping a hill of corn. At this moment the upper cup G, being full of corn also, fills the carrying-cup I of the sliding bill. As the wheel A moves forward the hoe L enters the ground, and when the wheel leaves the pedal K the hoe throws the dirt over the corn. The spring M at this time not only pushes back the hoe L but also pushes down the sliding bill F and its traveling cup I, which brings a new charge of corn for another hill. This new charge remains in the bills while the wheel A makes a complete revolution. Therefore, the charge is always ready in the bills, and no time is lost in dropping a hill of corn.

The driver rides upon the seat N, and by placing his foot upon the treadle O and one hand on the pull P he can easily elevate the wheels A, and thus stop the planting. The lever O is locked upon the axle C, and thus keeps the planting-wheels elevated, as seen in Fig. 1 in dotted lines. The shafts are adjustable up and down on the posts or frame R, so as to give the driver more or less leverage suited to his weight, and thus enable him to easily work the machine. One of the planting-wheels A may be taken off from the horse-machine and placed upon the axle S of the harrow-frame, Fig. 5, Sheet 3. Then one of the elevating wheels C is also taken from the horse-machine and put on the small axle T of the same harrow-frame, Fig. 5, thus forming a very convenient hand planting-machine. Also a pair of bills, E and F, with the pedal, hoe, and spring M, may be removed from one of the traveling wheels A and screwed upon the box U, Fig. 6, Sheet 3, thus forming a convenient hand replanter for replanting hills, which fail to come up, or are destroyed by worms, crows, or otherwise. The axle C of the large machine should be made so that the wheels A may be set wider apart or nearer together, to suit the desired width of the rows of corn.

Having described our invention, we claim—

1. The wheel A, having spokes and a hollow felly, in combination with the planting-bills, substantially as set forth.

2. The spring seed-carrying cup I, in the sliding bill F, in combination with the stationary bill E, and cup H, substantially as set forth.

3. The hoe L, and pedal K, in combination with the sliding bill F, substantially as set forth.

In testimony that we claim the foregoing as our own we affix our signatures in presence of two witnesses.

THOS. L. RITTENHOUSE.
J. VANCE LEWIS.

Witnesses:
DANIEL BREED,
F. G. DIETERICH.